Figure 1:
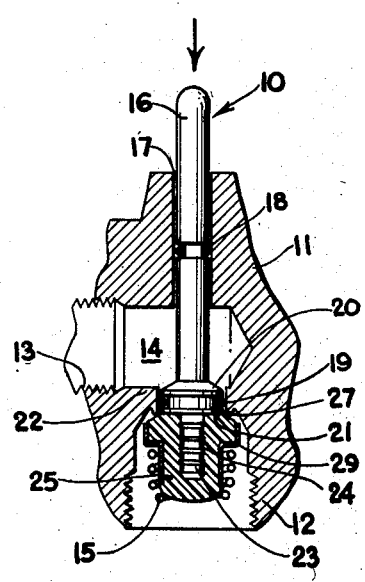

July 7, 1959    C. K. HUTHSING, SR    2,893,687
VALVE STRUCTURE
Filed June 6, 1956

INVENTOR.
CHARLES K. HUTHSING, SR.
BY Elliott & Pastoriza
ATTORNEYS

2,893,687

VALVE STRUCTURE

Charles K. Huthsing, Sr., Culver City, Calif.

Application June 6, 1956, Serial No. 589,804

4 Claims. (Cl. 251—357)

This invention generally relates to a valve structure and more particularly to a valve structure which is preferably employed as a plunger assembly in a fire extinguisher head construction. For this reason, the invention will be described from the standpoint of its embodiment in a portable fire extinguisher, although it will be appreciated that this novel valve structure may be advantageously employed in other similar applications.

It is common practice in the construction of many types of portable fire extinguishers and other valved dispensing structures to include a plunger within the head assembly adapted to be manually actuated in order to discharge the contents of the tank. The plunger assembly conventionally comprises an elongated rod with a sealing device attached to its lower end. The sealing device is usually biased to seat within the extinguisher head and normally prevent the discharge of the pressurized contents of the extinguisher or tank. When the extinguisher is to be operated, the rod is forced downwardly by a handle or the like to cause the sealing device to unseat and provide a passageway for the escape of the powdered chemicals or liquid within the tank.

It is thus apparent that the plunger assembly must effectively seal off the contents of the extinguisher tank during long periods of non-use of the extinguisher in order that the operator may be assured, under emergency conditions, that proper pressure has been maintained within the tank. Many troublesome difficulties have been encountered in an attempt to properly develop a plunger rod and sealing device of a simple construction, which may be inexpensively manufactured, and yet which will properly maintain an effective seal. The problem is additionally complicated by the fact that the sealing device must be maintained in its seated position with a relatively small spring force in order to permit quick release by manual actuation.

It is, therefore, an object of the present invention to provide a valve structure of a form particularly adaptable to embodiment in a fire extinguisher head assembly, which is of a simple construction and yet of a design enabling an effective seal over an extended period of time.

Another object of the present invention is to provide a valve structure for incorporation in a fire extinguisher head assembly, which is constructed such that it will maintain an effective seal with only a small amount of spring force and which may be readily released in order to bring about a rapid discharge of the contents of the extinguisher tank.

Briefly, these and other objects of the present invention are attained by providing a valve structure or a plunger assembly combination comprising an elongated rod having a reduced diameter stem extending from one end. A plastic seal (or seal formed of material having equivalent properties) is provided which has a bore adapted to receive the stem. The bore is closed off at one end within the seal so that the seal completely encloses the stem. In addition, a metallic retainer is provided which is adapted to resiliently encircle the seal.

The valve structure or plunger assembly of the present invention is designed to be an improvement over the seal shown in applicant's co-pending application entitled "Pressurized Fire Extinguisher" filed August 23, 1955, and identified by Serial Number 530,024, now Patent No. 2,864,451, of Dec. 16, 1958. In that application, it will be noted that the sealing material is preferably formed of a material that will "cold flow" under pressure. Although such a material (for example, "Teflon") is extremely desirable because of its ability to provide a durable gas-tight valve, a problem is encountered in endeavoring to prevent undesirable flow of the plastic material. Thus, some type of retainer must be used; and yet the structural relationship between the retainer and the plastic seal must be such that no leakage will occur. In some instances, leakage could occur between the stem and the seal by passing down between the retainer and seal and thereafter up along the stem.

It is, therefore, a still further object of the present invention to provide a structural relationship between the retainer and the seal of the plunger assembly of the present invention which is effective to prevent any leakage therethrough.

Figure 2:
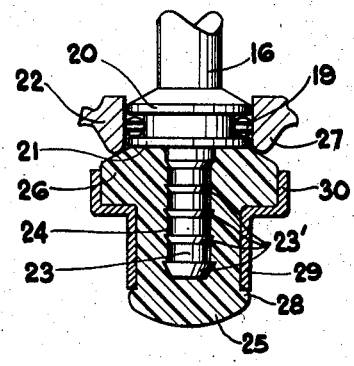

A better understanding of the present invention will be had by reference to the drawings, showing a preferred embodiment of the invention, in which:

Figure 1 is a fragmentary sectional view through a typical fire extinguisher head showing the valve structure or plunger assembly of the present invention therein; and, Figure 2 is an enlarged view of the lower portion of the plunger assembly shown in Figure 1.

With reference to the drawings, there is shown in Figure 1 a valve structure or plunger assembly 10 mounted within a typical fire extinguisher head 11. The head 11 is only partially shown for the purpose of describing and explaining the operation of the plunger assembly 10 in one typical application. The head 11 includes a lower internally threaded boss 12 for connection to the upper portion of a fire extinguisher tank (not shown). The head 11 is also provided with a threaded discharge conduit 13 connecting with a chamber 14. With such an arrangement, upon downward actuation of the plunger assembly 10, gases or chemicals may pass up from the extinguisher tank through the interior of the boss 12 and thereafter into the chamber 14 to pass outwardly through the discharge conduit 13. Normally, the plunger assembly 10 is held in its seated position by a spring 15, as shown in Figure 1.

The plunger assembly 10 includes an elongated cylindrical rod 16 passing downwardly through a close fitting bore 17 within the head 11. The rod is provided intermediate of its length with an O ring 18 which forms a seal between the rod 16 and the bore 17, and thus prevents the escape of the contents up through the bore 17.

The plunger assembly is conventionally operated in most extinguisher constructions by a handle or other lever which is adapted to exert a force in the direction of the arrow in Figure 1 to thus overcome the opposing force of spring 15 and urge the plunger assembly 10 downward.

At the lower end of the rod 16 is provided an O ring 19 held between an upper flange 20 and a lower flange 21 to form a seal between the rod and the surrounding seat or side walls 22 of the head 11, as shown more clearly in Figure 2.

A stem 23 extends downwardly from the lower end of the rod 16 and is provided with radial projections 23' to be force fitted within a bore 24 closed off within a seal 25. The seal 25 is preferably formed of a "cold-flowing" plastic, such as Teflon, as disclosed in the above referred to co-pending application of applicant. The seal 25 includes an enlarged conical head portion 26 which abuts against an annular ridge 27 extending downwardly from the sidewalls 22 of the head 11. In view of the "cold-flowing" characteristics of the sealing material 25, the head 26 will tend to maintain constant contact with the encircling ridge 27 regardless of variations in the pressure of the spring 15 during extended periods of non-use of the extinguisher. It will be evident, however, that a double sealing action will be effected since the O ring 19 will also be compressed between the side walls 22 of the head 11.

Near the base of the seal 25 is provided an annular shoulder 28. A generally cylindrical metallic retainer 29 is shown as circling the main body portion of the seal 25. The retainer 29 is dimensioned with a diameter slightly smaller than the maximum width of the base portion 25 such that it may be resiliently snapped in to position over the base portion of the seal so as to be restrained in axial movement between the shoulder 28 and the enlarged diameter head 26. The retainer 29 terminates at its upper end with an increased diameter cup section 30 partially enclosing the head 26 of the seal 25.

The cup section 30 of the retainer 29 performs an important function in that it tends to limit and at the same time effectively direct the desired "cold-flowing" of the Teflon material forming the seal 25. Thus, in response to pressure from the spring 15 causing engagement between the ridge 27 and the head 26 of the seal, the plastic material in the head 26 would normally tend to flow axially downwardly and radially outwardly. However, the cup section 30 prevents to a great extent such flow, whereby proper sealing contact is maintained between the ridge 27 and the head 26, despite variations in the pressure of the spring 15.

It will be evident from the construction employed, that no gases can leak between the stem 23 and the seal 25 since the stem 23 is completely enclosed within the seal 25. In addition, a structure is provided which is extremely simple to manufacture and yet which is effective to retain a relatively permanent seal so that a user or operator may always be assured that proper pressure has been maintained within the tank.

It will be appreciated, nevertheless, that variations could be made in the preferred construction without departing from the spirit and scope of the invention. The invention is, therefore, not to be thought of as limited to the particular structure disclosed for illustrative purposes.

What is claimed is:

1. A plunger assembly comprising in combination: a cylindrical rod having a first O ring located generally midway in its length; a reduced diameter stem extending from one end of said rod; a plastic seal provided with a bore to receive said stem with a force fit, said bore being closed off at one end within said seal, said seal being generally cylindrical and having increased diameter base portions, at least one of said base portions forming an annular shoulder; and, a generally cylindrical metallic retainer at least a portion of which is adapted to resiliently encircle said seal, said portion of said retainer having a maximum width slightly less than that of said one of said base portions, whereby said retainer may be snapped into position over said one of said base portion onto said annular shoulder.

2. A plunger assembly according to claim 1, in which the other of said base portions constitutes an enlarged head, and in which said retainer is provided with a cup shaped end dimensioned to encircle and partially enclose said head.

3. A plunger assembly according to claim 2, in which said plastic seal has the characteristic of "cold-flowing" under pressure.

4. A plunger assembly comprising, in combination: a rod, a stem extending from one end of said rod; a cold-flowing seal provided with a bore to receive said stem, said bore being closed off at the end within said seal; a metallic retainer at least a portion of which is adapted to resiliently encircle said seal, said seal having base portions with a greater maximum width than said portion of said metallic retainer, whereby said metallic retainer may be snapped into position by forcing said retainer over one of said base portions.

References Cited in the file of this patent

UNITED STATES PATENTS

| | | |
|---|---|---|
| Re. 23,142 | Allen | Aug. 23, 1949 |
| 2,001,487 | Doherty | May 14, 1935 |
| 2,608,210 | St. Clair | Aug. 26, 1952 |
| 2,641,278 | Eplett | June 9, 1953 |
| 2,666,614 | Grove | Jan. 19, 1954 |
| 2,776,104 | Sinkler | Jan. 1, 1957 |
| 2,797,701 | Nurkiewicz | July 2, 1957 |